United States Patent [19]

Hanke et al.

[11] Patent Number: 4,854,671
[45] Date of Patent: Aug. 8, 1989

[54] MOUNT FOR OPTICAL ELEMENTS

[75] Inventors: Peter Hanke, Eichenau; Rolf D. Grimminger, Oberschleissheim, both of Fed. Rep. of Germany

[73] Assignee: Optische Werke G. Rodenstock, Munich, Fed. Rep. of Germany

[21] Appl. No.: 31,009

[22] PCT Filed: Jun. 14, 1986

[86] PCT No.: PCT/DE86/00252
§ 371 Date: Feb. 11, 1987
§ 102(e) Date: Feb. 11, 1987

[87] PCT Pub. No.: WO86/07470
PCT Pub. Date: Dec. 18, 1986

[30] Foreign Application Priority Data

Jun. 15, 1985 [DE] Fed. Rep. of Germany ....... 3521640

[51] Int. Cl.$^4$ .............................................. G02B 7/02
[52] U.S. Cl. ..................... 350/252; 350/253
[58] Field of Search ............... 350/252, 253, 245, 255; 354/286

[56] References Cited

U.S. PATENT DOCUMENTS 3,904,276  9/1975  Whitaker et al. ................... 350/253

FOREIGN PATENT DOCUMENTS

| 0104097 | 3/1984 | European Pat. Off. . | |
| 2061661 | 6/1972 | Fed. Rep. of Germany . | |
| 2311952 | 12/1976 | France . | |
| 2428852 | 2/1980 | France | 350/253 |
| 0151230 | 10/1981 | German Democratic Rep. | 350/253 |
| 59-28107 | 8/1982 | Japan . | |
| 58-93011 | 6/1983 | Japan | 350/252 |
| 58-187907 | 11/1983 | Japan . | |
| 59-31914 | 2/1984 | Japan | 350/253 |
| 0636681 | 12/1978 | U.S.S.R. | 350/253 |
| 1359173 | 7/1974 | United Kingdom . | |

Primary Examiner—Bruce Y. Arnold
Assistant Examiner—Loha Ben
Attorney, Agent, or Firm—Antonelli, Terry & Wands

[57] ABSTRACT

A mount for an optical element such as a lens element wherein the optical element has a cylindrical circumferential rim and at least three ribs formed of a material having a highly elastic property. The ribs have a predetermined length and are disposed at a predetermined distance from one another along the cylindrical circumferential rim of the optical element with each rib having an inner periphery in continuous contact with an outer periphery of the cylindrical circumferential rim of the optical element. The ribs are compressed on assembly of the optical element into the mount so that centration of an optical system, e.g., the lens, is substantially improved.

12 Claims, 2 Drawing Sheets

MOUNT FOR OPTICAL ELEMENTS

TECHNICAL BACKGROUND

The present invention relates to a mount for optical elements, such as lens elements.

Such mounts are required, for example, for lenses but also for optical instruments of all types, such as examining instruments, binoculars, etc.

STATE OF THE ART

The general problem with such mounts is that the rotational symmetry of mounted optical systems is impaired for the most part by the amount of play in the fitting between element and mount. By narrowing down the ISO (International Standard Organization) fitting tolerances it is possible to improve the rotational symmetry of the fully assembled system if increased production costs are also accepted. However, this method is subject to physical limits:

It will be normally so that the element materials have different thermal expansion coefficients to the mount materials. The amount of play in fitting at room temperature must be selected in such a way that sufficient contraction reserves are available for temperature variations. If this amount of play is not available in a sufficient amount, then high radial stress can occur in the elements which, under certain conditions, may lead to a dramatic decrease in the optical performance. Particular attenion in this respect must be paid to the fact that with the mount material aluminum, which is used in 99% of all cases, the difference between its expansion coefficient and representative expansion coefficients of optical glass materials can vary on the order of up to $16 \times 10^{-6}$.

For this reason, it was suggested in U.S. Pat. No. 2,221,736, that a rubber-like coating be applied to the V-shaped rim of an ophthalmic lens. This coating of the V-shaped rim of an ophthalmic lens is not intended only to compensate for formal differences between a spectacle frame and spectacle lens but also to "absorb changes in thermal orders".

The formal differences addressed in the above U.S. Patent refer to the typical formal differences which occur on the edging of "uncut round" lenses into spectacle frames, that is they do not refer to fitting tolerances of high-precision optical systems. The use of the coating described in U.S. Pat. No. 2,221,736 for high-precision optical systems is not documented in the patent and is evidently not intended as the centration problem of high-precision optical systems are not encountered with spectacle frames.

A mount of a different type is known from the German Pat. No. DE-PS 1 113 101. With this mount, a rubber ring is used which is inserted into a groove in the mount body and which comes into contact with one surface of a lens element in such a way that the lens element is pressed elastically against a register.

The design described in this patent does permit the sealing of the mount body, but it is not able to provide any real reduction on the typical centration errors which occur due to fitting tolerances.

Further, lens element mounts where elastic elements are used are known from the DDR patent 207 047 and the German Pat. Nos. 1 122 738, 1 127 110, 1 547 276, 2 061 661 and 26 19 288. These mounts of a different type to that of the present invention, however, all have the disadvantage that they produce great efforts in their manufacture and, in addition, do not produce hardly any reduction in the centration errors of optical systems: For example, according to German Pat. No. 1 122 736, a divided mount into which the lens elements are inserted is used. Such a mount requires not only a great deal of manufacturing effort, but also has relatively large inherent errors which occur, for example, through the "dividing process" and which cannot be compensated for by the elastic material provided in the grooves which the lens elements are fitted into.

SUMMARY OF THE INVENTION

The object of the present invention is to describe a mount of simple construction for optical elements, such as lens elements or similar, where the centration of the optical elements is always ensured even when subject to thermal and dynamic strain.

This object is solved according to the present invention by using as a base a mount and by providing an optical element to be assembled to the mount with at least three ribs of a material having a highly elastic property at spaced distances from one another.

The invention is based on the idea of, on the one hand, providing a sufficiently dimensioned radially symmetric expansion joint between the optical element, for example a lens element, and the mount and, on the other hand, ensuring by suitable means that the centration of the lens element is also always ensured in cases of thermal and dynamic strain. Surprisingly, this object can be achieved by fixing at least three ribs of highly elastic material at distances to one another on the cylindrical circumference rim of the lens element or the optical element. Due to the lack of air compensation during the assembling of the lens elements into the mount, ribs which cover the whole circumference cannot be used.

The dimensioning of the normal gap width between mount and lens element is done in such a way that both the ISO fitting tolerances for diameters and their amounts of thermal expansion can be taken up by the highly elastic ribs at just acceptable pressure fluctuations.

The length and number of the ribs must be made dependent on the softness of the highly elastic rib material and on the desired fitting stability of the integrated lens element. According to the feature of the present invention only three ribs are provided whose angular extent is approx. 60° in all cases and those centers are at an angular distance to one another of approx. 120° in all cases is especially advantageous.

According to another feature of the present invention, compression of the ribs under normal conditions by 50% permits in this process the compensation of all gap widths produced by fitting tolerances and temperature fluctuations.

Typical rib heights h and gap widths s are given in tabular form for certain nominal dimensions in a table in the following specification. It is expressly pointed out here that these figures are examples only and that deviations are possible at any time according to conditions of use, according to the rib material used, etc.

In principle, the most varied elastic materials which have a high adhesion to glass materials and lacquers and which also have high flexibility and do not show any long term plasticity (creeping capability) can be used as the material for the highly elastic ribs. In addition, the materials used for the ribs should have a sufficiently low viscosity and a sufficiently high surface energy (surface tension). Other favourable properties which, in particular, make the assembly of the mount easier are: a one-component structure of the elastic material, sufficient gliding capability of the cross-linked surface, good resistance to wear and ultrasonic washing capability. And finally, the material should be resistant to environmental influences such as temperature, dampness, UV radiation and microbes.

One suitable material which meets the demands listed above is, for example, the one-component silicon rubber available commercially under the name SIL 09.

The positional stability and so also the concentration of the optical system can be further improved by using a locking ring or a sliding ring which is glued into position which are also provided with elastic ribs, preferably with three elastic ribs. The ribs of these holding rings are compressed so much during insertion that it is not possible for the lens to slip out of the ring edge if any dynamic strain occurs.

SHORT DESCRIPTION OF THE DRAWING

The invention is described below in detail in the form of examples and with reference to the drawing in which FIG. 1 shows a top view and a cross-section at I—I of a lens element provided with elastic ribs according to the present invention, FIGS. 2 and 3 show lens elements in accordance with FIG. 1 which have been assembled into a mount and where in addition a locking ring or a glued sliding ring is used which has also been provided with elastic ribs.

DETAILED DESCRIPTION OF THE INVENTION

Figure 1:
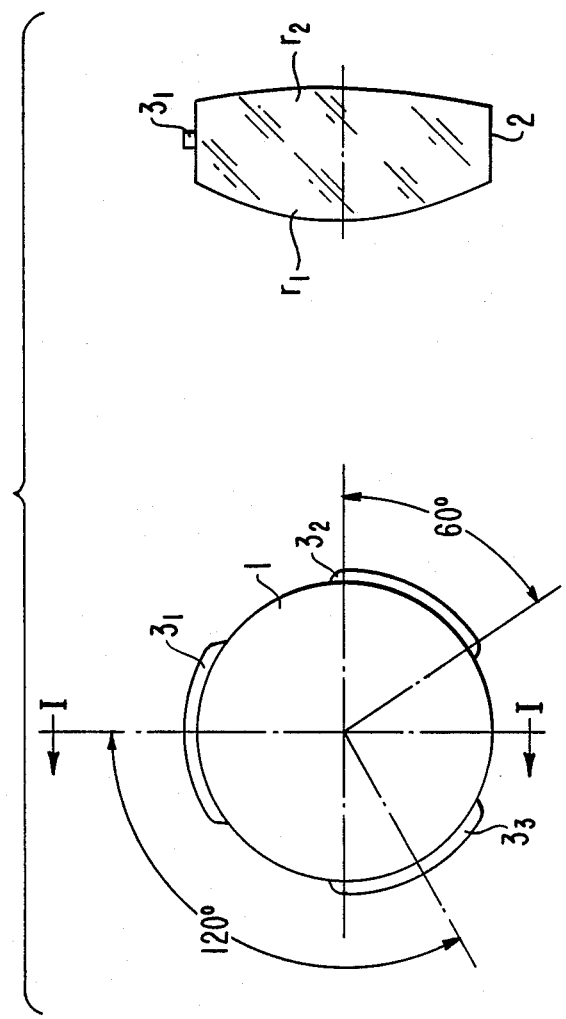

FIG. 1 shows a lens element 1 with the optical surfaces r1 and r2 and a cylindrical circumferential area 2 onto which the elastic ribs $3_1$, $3_2$ and $3_3$ have been applied. The elastic ribs 3 have an angle extent of 60° and an angle distance of 120°.

Figure 2:
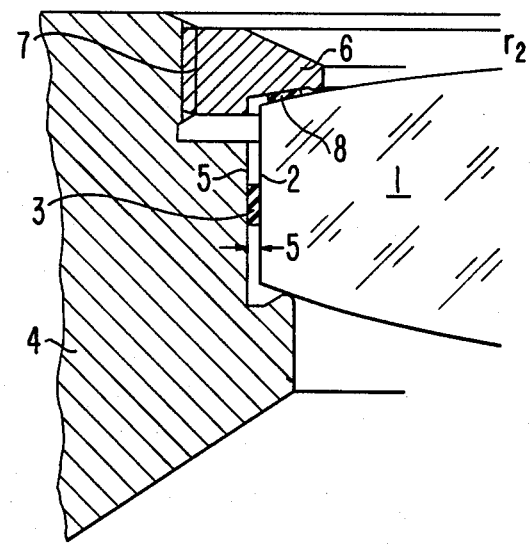
Figure 3:
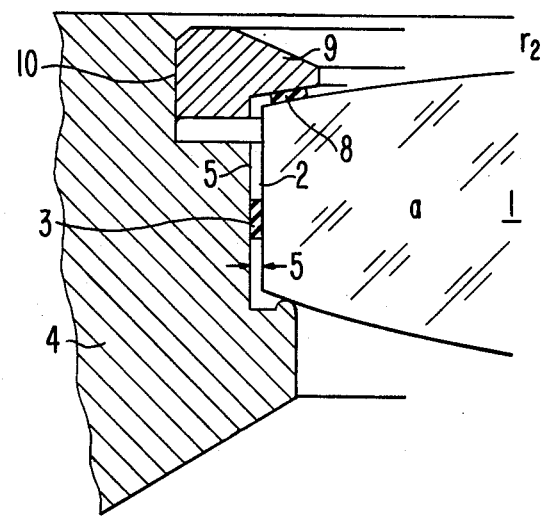

FIGS. 2 and 3 show the assembly of a lens element 1 provided with such elastic ribs 3 into a mount 4. The nominal gap width s between the cylinder surface 2 of the lens element 1 and the relevant surface 5 of the mount 4 has been selected in such a way that both the ISO fitting tolerances of diameters and their thermal expansion amounts can be taken up by the highly elastic ribs 3 at just acceptable pressure fluctuations. In this process it was found particularly advantageous if the height of the ribs 3 on assembly into the mount 4 is compressed to 50% and that height change of the ribs due to fitting tolerances and temperature changes is +33%. Typical nominal gap widths and rib heights for different lens element diameters and mount diameters in the ISO fitting system h7/H6 have been collected together in the following table where N is a nominal or standard dimension for fitting purposes, and h7 represents a subtraction amount and H6 represents an additional amount to achieve assembly:

| Nominal measurement N mm | Lens element diameter mm | Mount diameter mm | Nominal gap width mm | Rib height mm |
| --- | --- | --- | --- | --- |
| ...18 | $(N-0.08)_{h7}$ | $N^{H6}$ | 0.040 | 0.08 |
| 18...30 | $(N-0.12)_{h7}$ | $N^{H6}$ | 0.060 | 0.12 |
| 30...50 | $(N-0.20)_{h7}$ | $N^{H6}$ | 0.100 | 0.20 |
| 50...80 | $(N-0.30)_{h7}$ | $N^{H6}$ | 0.150 | 0.30 |
| 80...120 | $(N-0.45)_{h7}$ | $N^{H6}$ | 0.225 | 0.45 |

Due to the differences in the expansion coefficients of the mount material, for example aluminum, and the lens element material it is evident that the positional stability obtained through the ribs provided for in accordance with this invention will decrease with increasing temperature and increase with falling temperature. Typical centration errors which, in practice, will arise due to varying rib heights will be in the order of one or two μm.

The centration errors can be reduced even more substantially by the rings shown in FIGS. 2 and 3.

FIG. 2 shows a locking ring 6 which is connected to the mount 4 by a thread 7. The locking ring 6 has three elastic ribs 8, of which only one is shown in FIG. 3, on a side which faces the lens element surface r2. The elastic ribs 8 also have an angle extent of approx. 60° in each case and an angle distance of approx. 120° in each case.

FIG. 3 shows a glued slide ring 9 which is connected to the mount 4 by a glue compound 10. In all other aspects, the glued ring 9 is designed in the same way as the locking ring 6 shown in FIG. 2 and has, in particular, three highly elastic ribs 8 with an angle distance of 120° in each case and an angle extent of 60° in each case.

When inserting the ring 6 or 9 into the mount 4, the three ribs 8 must be compressed so much that the lens element 1 cannot escape from the ring edge in the face of the dynamic strain for which the mount has been designed. The locking ring 6 shown in FIG. 2 is turned tight to the stop and then turned back about ¼ turn. The glued slide ring 9 is, for example, exposed to uniform strain with a weight of 100 times that of the lens element and glued into the mount.

With these rings, the pressure fluctuations in the axial direction due to temperature variations are also largely suppressed.

The invention is described above by means of version examples without any limitation of the general validity being implied. Within the central idea in accordance with this invention, the most varied variations are possible. It is in particular possible to alter the gap widths quoted here or the height:width relationship of the elastic ribs in accordance with any special requirements. In addition, the angle extent and the number of ribs used can also be adapted to meet the specific demands in question.

We claim:

1. A mount for an optical element comprising an optical element having a cylindrical circumferential rim and at least three ribs formed of a material having a highly elastic property provided on the cylindrical circumferential rim, each rib having a predetermined length and being disposed at a predetermined distance from one another along the cylindrical circumferential rim of the optical element, each rib having an inner periphery thereof in continuous contact with an outer periphery of the cylindrical circumferential rim of the optical element, the ribs being compressed on assembly of the optical element into the mount.

2. A mount according to claim 1, wherein only three ribs are provided on the cylindrical circumferential rim of the optical element, each rib of the predetermined length having an angular extent of approximately 60 degrees, and an angular distance between centers of the ribs being approximately 120 degrees.

3. A mount according to claim 1 or 2, wherein the ribs have a height selected so that at normal environmental conditions and fitting of the optical element into the mount, the ribs are compressed by 50% and a height change of the ribs due to fitting tolerances and temperature changes is approximately +33%.

4. A mount according to claim 3, wherein the mount, the optical element, and the ribs have the following values for enabling fitting of the optical element into the mount, the optical element being a lens element, N being a nominal or standard dimension for fitting purposes, h7 representing a subtraction amount and H6 representing an additional amount to achieve proper assembly:

| Nominal measurement N mm | Lens element diameter mm | Mount diameter mm | Nominal gap width mm | Rib height mm |
| --- | --- | --- | --- | --- |
| ... 18 | $(N-0.08)_{h7}$ | $N^{H6}$ | 0.040 | 0.08 |
| 18 ... 30 | $(N-0.12)_{h7}$ | $N^{H6}$ | 0.060 | 0.12 |
| 30 ... 50 | $(N-0.20)_{h7}$ | $N^{H6}$ | 0.100 | 0.20 |
| 50 ... 80 | $(N-0.30)_{h7}$ | $N^{H6}$ | 0.150 | 0.30 |
| 80 ... 120 | $(N-0.45)_{h7}$ | $N^{H6}$ | 0.225 | 0.45 |

5. A mount according to claim 4, further comprising a ring member having a plurality of ribs formed of a material having a highly elastic property disposed on a surface of the ring member adapted to oppose an optical surface of the optical element, the ribs of the ring member being arranged so as to lie in contact with the optical surface of the optical element when the optical element and ring member are assembled into the mount.

6. A mount according to claim 1 or 2, wherein the mount, the optical element, and the ribs have the following values for enabling fitting of the optical element into the mount, the optical element being a lens element, N being a nominal or standard dimension for fitting purposes, h7 representing a subtraction amount and H6 representing an additional amount to achieve proper assembly:

| Nominal measurement N mm | Lens element diameter mm | Mount diameter mm | Nominal gap width mm | Rib height mm |
| --- | --- | --- | --- | --- |
| ... 18 | $(N-0.08)_{h7}$ | $N^{H6}$ | 0.040 | 0.08 |
| 18 ... 30 | $(N-0.12)_{h7}$ | $N^{H6}$ | 0.060 | 0.12 |
| 30 ... 50 | $(N-0.20)_{h7}$ | $N^{H6}$ | 0.100 | 0.20 |
| 50 ... 80 | $(N-0.30)_{h7}$ | $N^{H6}$ | 0.150 | 0.30 |
| 80 ... 120 | $(N-0.45)_{h7}$ | $N^{H6}$ | 0.225 | 0.45 |

7. A mount according to claim 1 or 2, wherein the material having a highly elastic property is silicon rubber.

8. A mount according to claim 1 or 2, further comprising a ring member having a plurality of ribs formed of a material having a highly elastic property disposed on a surface of the ring member adapted to oppose an optical surface of the optical element, the ribs of the ring member being arranged so as to lie in contact with the optical surface of the optical element when the optical element and ring member are assembled into the mount.

9. A mount according to claim 8, further includes means for fixing the ring member to the mount.

10. A mount according to claim 9, wherein the fixing means includes thread means for fixedly attaching the ring member and the mount.

11. A mount according to claim 9, wherein the fixing means includes glue means for fixedly attaching the ring member and the mount.

12. A mount according to claim 1, wherein the optical element is a lens.

* * * * *